United States Patent [19]

de Bijl et al.

[11] 4,224,665
[45] Sep. 23, 1980

[54] BUS-ORGANIZED COMPUTER SYSTEM WITH INDEPENDENT EXECUTION CONTROL

[75] Inventors: Adrianus M. J. de Bijl; Hans Cramwinckel, both of Beekbergen, Netherlands

[73] Assignee: U.S. Philips Corporation, New York, N.Y.

[21] Appl. No.: 770,808

[22] Filed: Feb. 22, 1977

Related U.S. Application Data

[63] Continuation of Ser. No. 608,161, Aug. 27, 1975, abandoned.

[30] Foreign Application Priority Data

Sep. 10, 1974 [NL] Netherlands ............... 7411989

[51] Int. Cl.² .................. G06F 3/04; G06F 9/06
[52] U.S. Cl. ......................................... 364/200
[58] Field of Search ... 364/200 MS File, 900 MS File

[56] References Cited

U.S. PATENT DOCUMENTS

| 3,369,221 | 2/1968 | Lethin et al. | 364/200 |
|---|---|---|---|
| 3,412,382 | 11/1968 | Couleur et al. | 364/200 |
| 3,560,937 | 2/1971 | Fischer | 364/200 |
| 3,573,741 | 4/1971 | Gavril | 364/200 |
| 3,579,197 | 5/1971 | Stapleford | 364/200 |
| 3,648,252 | 3/1972 | Thron et al. | 364/200 |
| 3,665,415 | 5/1972 | Beard et al. | 364/200 |
| 3,704,453 | 11/1972 | Blackwell et al. | 364/200 |
| 3,710,328 | 1/1973 | Hunter et al. | 364/200 |
| 3,757,307 | 9/1973 | Cosserat et al. | 364/200 |
| 3,827,029 | 7/1974 | Schlotterer et al. | 364/200 |
| 3,833,930 | 9/1974 | Macker | 364/200 |
| 3,909,790 | 9/1975 | Shapiro et al. | 364/200 |
| 3,911,402 | 10/1975 | McLean et al. | 364/200 |
| 3,916,383 | 10/1975 | Malcolm | 364/200 |
| 3,925,766 | 12/1975 | Bardotti et al. | 364/200 |
| 3,936,804 | 2/1976 | Bachman | 364/200 |
| 3,943,494 | 3/1976 | Holmes, Jr. et al. | 364/200 |
| 3,967,246 | 6/1976 | House | 364/200 |
| 3,996,564 | 12/1976 | Kerrigan et al. | 364/200 |

*Primary Examiner*—Melvin B. Chapnick
*Attorney, Agent, or Firm*—Thomas A. Briody; Jack Oisher; James J. Cannon, Jr.

[57] ABSTRACT

A Computer system which includes a central processing unit, a central memory storage unit and a plurality of peripheral devices, the central processing unit having a control unit for dividing single complete input/output instructions for the transfer of data within the system into a sequence of discrete, separately executable, time independent operation instructions under the control of a microprogram. The system further includes peripheral device control units for the control of the independent execution of the discrete divided input/output (I/O) operation instructions. A microprogram command line is connected to the control unit in the central processing unit for controlling the output of the discrete I/O operation instructions along the system bus. An interruption request unit is also included within each of the peripheral device control units for generating an interrupt in the central processing unit after the termination of an operation instruction, both to permit the updated status of instructions to be recorded and to indicate the availability of a specific I/O device for further use. After the control unit in the central processing unit divides single complete input/output instructions into a plurality of separate operation instructions for operation steps which relate to particular functional characteristics of the peripheral devices in the system, the peripheral device control units control the individual execution of each separate operation in a specific sequence but independently of each other in time within that sequence. The individual data operations are transferred over the bus of the system.

16 Claims, 9 Drawing Figures

BUS-ORGANIZED COMPUTER SYSTEM WITH INDEPENDENT EXECUTION CONTROL

This is a continuation of application Ser. No. 608,161, filed Aug. 27, 1975, now abandoned.

BACKGROUND OF THE INVENTION

This invention relates to a computer system with a bus structure, wherein a bus control unit controls the traffic on the bus, and further including a cental processor which is connected to the bus, a storage unit which is at least indirectly connected to the bus, and a number of peripheral apparatus control units and associated peripheral devices which are connected to the bus.

Presently bus-structured computer systems receive substantial attention. Particularly in the field of small computer systems there is a tendency to utilize a bus for the interconnection of the various units, the aim being to connect the units to the bus by way of a standard interface. The bus can then have a universal and simple construction, which increases the flexibility of the entire computer system. Adaptation of the computer system to users' demands for all sorts of applications is thus possible.

The principle of the invention relates to so-called bus-organized computer systems in general, and is not restricted to a given form of such a computer system. In view of the desire to develop computer systems which are suitable for a wide variety of users, it is an increasingly stringent demand that the effort required for the design and writing of application programs be minimized. To this end, it is necessary that the instructions given to a programmer for writing a program are as simple as possible. This is to be understood as follows: the processing of data in a computer system involves many complex situations where the program must provide correct control. Such a complex situation occurs notably in the case of input/output instructions, particularly the input/output instructions where peripheral devices requiring complex control are involved. Relevant examples are: disc stores storage units and data communication connections. If the programmer has only an inadequate set of instructions for the for the control of such a complex situation, an additional effort is required in building up and writing the programs. Thus far proposals have been made which in essence facilitate the task of the programmer by the development of instructions which are simple and still serve for the control of complex situations. However, in practice this means that the problem is shifted to the level of the system programs, i.e. the programs which are usually developed by the manufacturer of the computer systems and which provide the general control, notably also for input/output instructions.

The development and continuous follow-up (training for use and assistance of the users by the supplier) of system programs, however, is also a very expensive matter and often substantial effort must be made to find optimum solutions.

Contemporary developments in the field of hardware, however, offer the possibility of shifting the described problem to the hardware.

Read-only memories are now available in many designs, also for repeated writing. Particularly read-only memories designed according to integrated circuit techniques offer substantial possibilities: high speed, reliability, small volume, low energy dissipation. Using these memories, extensive application of microprogramming is possible, and many program functions can be taken over by the microprogram control in a computer system.

The present invention relates to a proposal to utilize, within bus-structured computer systems, the described possibilities offered by the new developments in the field of hardware in a very special manner. Moreover, according to the set-up of the invention a distribution of functions between the various sections of a bus-structured computer system is achieved on an efficient basis. This is important in view of costs: functions which can be centrally performed on the basis of "sharing" in the central processor must also be performed as much as possible in this processor. An optimum compromise must then be made in view of the occupation of the central processor on the one hand, and the multiple spreading, depending on the number of peripheral devices, of the hardware on the other hand.

SUMMARY OF THE INVENTION

To satisfy the described demands and requirements, a computer system comprising a bus structure according to the invention is characterized in that on the basis of singular program instructions for complete input/output instructions, serving for the transfer of data in the computer system, the central processor includes control means whereby the input/output instructions can be divided into a number of separate operation steps which are independent of each other in time and which can be independently performed by a peripheral apparatus control unit, storage means in the computer system serving for updating the execution of the operation steps, the control means dispatching, in conjunction with the bus control unit, an operation step via the bus to a peripheral apparatus control unit which comprises means for making an assigned peripheral device execute an operation step, the peripheral apparatus control units furthermore including interruption request means which are known per se and whereby, after termination of an operation step, an interruption request can be applied to the central processor; after the granting of an interruption request, the storage and control means in the central processor providing the dispatch of an operation step, following the preceding operation step for a relevant peripheral device.

Using this step-up of the input/output instructions, forming the most important instrument in the use of a computer in its communication with the exterior, notably including the user and his program and associated data, the programming is simple; singular program instructions are possible for the control of complex situations in the system. Due to the use of the control means in the central processor, such a splitting up of the input/output instructions is achieved such that operation steps are produced which give rise to optimum situation control. Each operation step is, except for the sequence wherein it is executed in relation to a preceding and a next step, independent in time and can be independently executed. This means that no so-called rush situations can occur: there is no risk that difficulties will arise during the execution of an operation step because a previous or next operation step in the computer system according to the invention is not time-related to the current operation step.

Due to the splitting at the area of the central processor, moreover, an advantageous function distribution in the computer system is obtained: the peripheral apparatus control units can have a simple set-up. Each time data concerning an operation step have to be applied to such a unit, a generally applicable bus transfer procedure is used. By means of this set-up, is also not a problem to execute a plurality of input/output operations simultaneously in the computer system. When an operation step is executed by a peripheral device (for example, searching a given cylinder in a disc storage device), simultaneously the peripheral apparatus control unit associated with this peripheral device or another peripheral apparatus control unit can receive another operation step for another peripheral device from the central processor. When the peripheral apparatus control unit has initiated the latter operation step, it is generally free again. The same is applicable to the level of the central processor. The central processor updates, by way of the storage means, which can be registered in the central processor and/or locations in the storage unit, the execution of the various operation steps, but is free to perform other tasks during the execution of the operation steps by the peripheral apparatus control units and the peripheral devices. The central processor is involved only during transfer of operation step information and other data via the bus.

The set-up according to the invention offers a further advantage which concerns error checking procedures. After completion of each operation step it is possible, if desired, to switch on the central processor (which takes place anyway by an interruption request when an operation step has been terminated) to check whether the operation step has been correctly performed. To this end, simply the interrogation of the status of the peripheral device by the central processor can be applied as an operation step. In that case no special facilities are required in each peripheral apparatus control unit, and the software, moreover, is relieved. The possibility of checking, without substantial additional hardware being required, the correct execution of each operation step in the central processor, normally best equipped for this purpose, implies that better error checking can be realized. If such a check were performed only after execution of a complete input/output instruction, it would be much more difficult to establish the origin of the error. The correction of such an error would then be more difficult and more time-consuming.

A preferred embodiment of the computer system according to the invention, wherein an input/output instruction is at least composed of an instruction, an address of a peripheral apparatus with associated peripheral device control unit, an address in the addressed space of the said peripheral device, and an address in an address space of a device of the computer system whereto or wherefrom data are to be transferred, is characterized in that the control means of the central processor comprises means whereby the said input/output instruction is divided into a number of separate operation steps which can be independently executed in time, an operation step consisting of at least one first operation step instruction comprising the address of the peripheral device with the associated peripheral apparatus control unit and an address portion of the address in the addressed space of the said peripheral device. The said embodiment is particularly applicable for an input/output instruction involving a disc storage unit as a peripheral device. A first operation step may then consist of an instruction "search cylinder", which means that a given cylinder of the disc storage is to be searched which is indicated in the operation step by the address of the peripheral device. The cylinder is then given as a first address portion of the addressed in the address space of the disc unit. A second operation step may then consist of an instruction "select sector", which means that a given sector on the searched cylinder of the disc unit is to be selected, the sector being given by the address of the peripheral device in this operation step. The sector is then given as a second address portion of the address in the addressed space of the disc unit. The second operation step may further consist of an instruction "read" or "write" and further address data, notably a starting address in the addressed space and a sector length information of the addressed space of the device, for example, the memory of the computer system wherein a read operation or write operation is to be effected. In a "key search" procedure another operation step is formed for a variety of feasible applications where data transfer in the bus-structured computer system are required.

Further advantages of the computer system according to the invention, concerning the described distribution of functions over the computer system, appear to be present if given situations are further considered. This will be demonstrated hereinafter, by way of example, on the basis of a function distribution which can arise in the computer system in the category of medium fast and fast peripheral device, such as magnetic tape equipment and disc storage units. A general problem encountered in this kind of peripheral device is notably presented by the data transfer between the storage units, i.e. the main or operating memory whose contents are used by the central processor for making its operations, and the said peripheral device. In the case of disc units, the speed of the data transfer is generally too high for the bus without giving rise to problems. In the case of magnetic tape memories, the block length is often so large that the bus is occupied too long by such a block transfer. The system bus in principle has a universal set-up and is actually not suitable for the transfer between the memory and (medium) fast peripheral device.

To mitigate this problem, it is known to utilize a called direct memory access facility in computer systems. It is then possible to perform the said data transfer via a separate connection outside the bus.

Using the set-up according to the invention, such a direct memory access facility can be organized very efficiently. A properly usable function distribution within such a computer system then exists. A computer system according to the invention provides a storage unit which is connected to at least one adaptation unit as well as at least indirectly connected to the bus. The adaptation unit itself is connected to the bus and is arranged between the bus and at least one assigned peripheral apparatus control unit with the peripheral device connected thereto. The adaptation unit thereby serves to effect a direct transfer of data between the storage unit and at least one peripheral device via a separate storage unit connection. The invention adaptation unit includes means wherein the starting addressed in the address space and the sector length information in the addressed space of the storage unit can be stored. Using this data, data transport between the storage unit and a peripheral device connected to the adaptation unit via the associated peripheral apparatus control unit is implemented by a second means in the adaptation unit. It will be obvious that such an adaptation unit is also capable, in view of the fact that the operation steps can be independently executed according to the invention, of performing this direct storage access function not only for one but also for a plurality of peripheral apparatus control units.

If in the described organization a key search operation can be applied for execution as one of the input/output instructions, it is advantageous for the computer system according to the invention that for an input/output instruction, referred to as "key searching", one of the operation steps produced by the control means of the central processor by division of the said "key search operation" can be taken up in an adaptation unit by third means, the said operation step consisting of a comparison instruction, the address of the key in the memory, and key information, further means being provided whereby these data can be used for the independent execution of the comparison between a key present in the memory and keys from the peripheral device which is connected to the adaptation unit via the associated peripheral control unit.

Further details and characteristics of the bus-organized computer system according to the invention will become apparent from the below description of the Figures.

BRIEF DESCRIPTION OF THE DRAWINGS

The invention will be described in detail hereinafter with reference to embodiments according to the invention.

DESCRIPTION OF THE PREFERRED EMBODIMENTS

Figure 1:
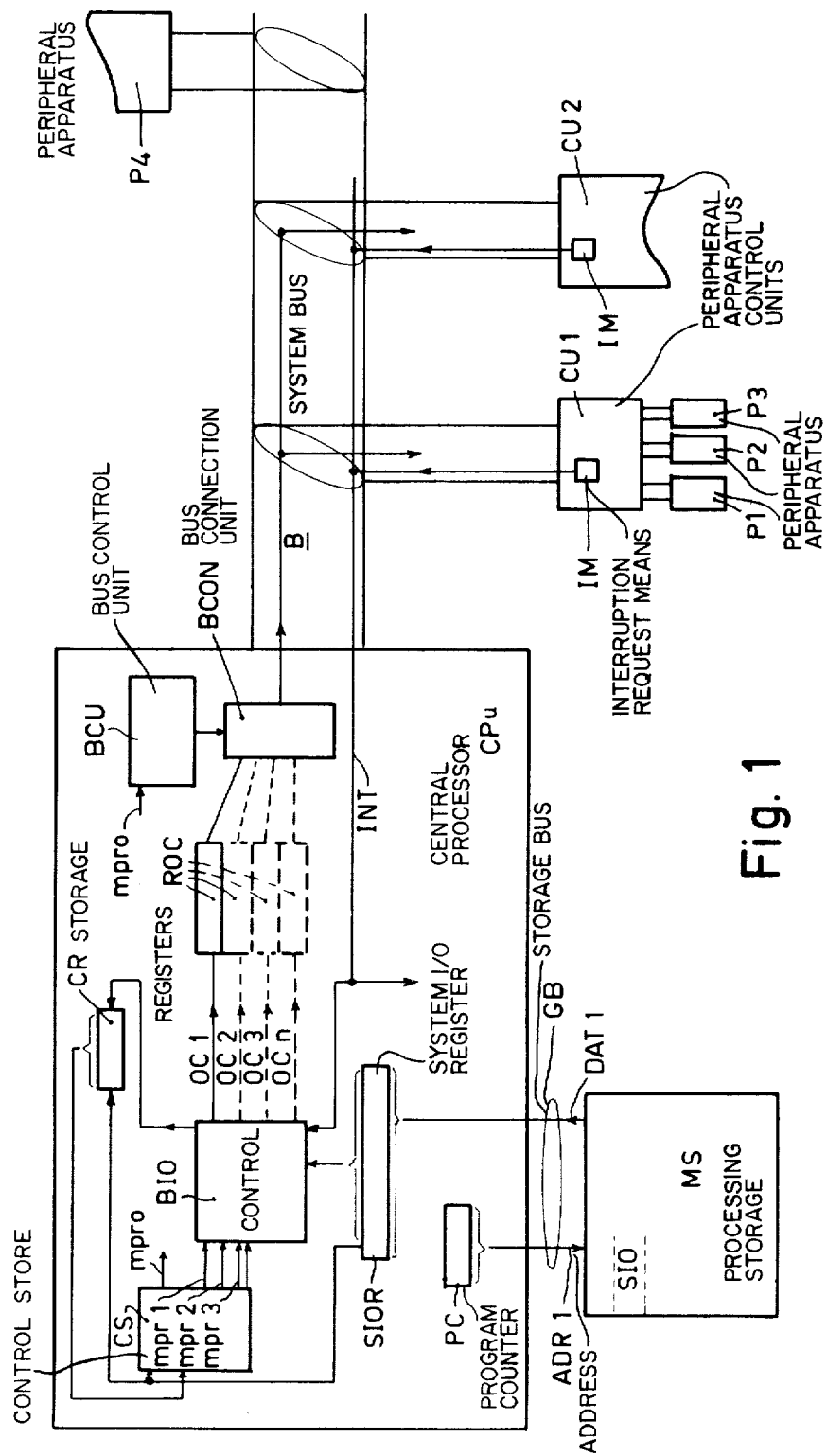
FIG. 1 shows a general set-up of the computer system according to the invention.

The reference CPU in FIG. 1 denotes the central processor which is connected to the peripheral equipment by way of a system bus B. The peripheral equipment consists of peripheral apparatus control units CU1, CU2 which are connected to the bus. These control units CU1, CU2 have connected thereto peripheral device P1, P2, . . . . It is also possible for peripheral device P4 to be connected to the bus by way of its own control unit instead of a separate control unit. Furthermore, the processing storage or memory MS is connected to CPU via storage bus GB, and hence indirectly to the bus B. Bus-structured computer systems of this kind are known, the transfer of instructions and data via the bus being controlled by means of a bus control unit BCU. The reference BCON denotes a bus connection unit for suitable connection between the CPU and the bus B. Furthermore, the reference PC denotes a program counter which can apply an address ADR to the storage unit MS. Information originating from the storage unit appears in register SIOR in CPU. Depending on the kind of input/output instruction, SIOR will be an extended register or a number of registers. In accordance with the invention, CPU comprises control means BIO and storage means CR, shown as a register by way of example; these storage means may alternatively be word locations of the store. The reference ROC denotes further register means.

The operation of the bus-organized computer system shown is as follows. It is to be noted that at this stage of the description of the invention emphasis is placed on simplicity, because this enables a better understanding of the idea of the invention.

Assume that the program counter PC contains an address ADR of storage MS wherein an input/output instruction SIO is stored as information. The information arrives in the register SIOR of the CPU via the lines DAT1. By means of this instruction SIO, a location in the control storage unit CS is assigned by the register SIOR. A microprogram word mpr 1 appears on the output of CS. This microprogram word mpr 1 is applied to the control means BIO. The address in CS, determined by the instruction SIO, is also stored in the register CR. Thereby it can be checked as to how far an operation has progressed. According to the invention, from this input/output operation an operation step OC1 which is independent in time and which can be independently executed by a peripheral device is derived under the command of mpr 1 in the control means BIO, using the data of the input/output operation stored in SIOR. An operation step thus formed is placed in a register ROC. From this register ROC, the operation step is applied, under the command of a microprogram command mpr o, via the bus connection BCON, to the relevant peripheral apparatus control unit via the bus. The execution of the operation step is completed without further involvement of the CPU. When the operation step has been executed, the peripheral apparatus control unit informs the CPU thereof via interruption request means IM. This is effected via the line INT shown in FIG. 1. An interruption request is recognized in CPU by way of this line. The interruption request has a double function: the interruption of a current program in the CPU, and the actuation of the register CR: the contents thereof are modified, on the basis of INT from the control means BIO (for example, increased by one unit), such that a subsequent microprogram word mpr 2 associated with this instruction can be addressed thereby in CS. If the interruption request is accepted by the CPU, an interruption takes place and a next operation step OC2 is derived by means of the microprogram word mpr 2 in the control means BIO and the data of the input/output operation in SIOR. This step is placed in register ROC and is subsequently dispatched via the bus. This procedure is repeated as many times as there are independent and independently executable operation steps OC wherein an input/output instruction has been divided.

The described set-up of the bus-organized computer system according to the invention includes the means required for implementing the principle of the invention. The operation steps in which an input/output instruction must be divided so as to satisfy the imposed requirements as regards the time-independent and individually executable operation steps depends on the type and nature of a peripheral device for which such an input/output instruction is intended. In order to explain the principle of the invention, on the basis of a practicable embodiment, which also serves to find solutions for other cases of the same kind, a simple embodiment will be described hereinafter which purposely was not chosen to be too simple; rather, a variety of aspects which are important so as to achieve proper division of an input/output operation into operation steps will become apparent. This example relates to the category of (medium) fast peripheral devices such as magnetic tape devices, and notably to a disc storage unit as a peripheral device. This choice was made, moreover, because disc storage units constitute an important storage medium in such bus-structured computer systems. It was also assumed that it is useful to describe the disc storage unit in the system set-up wherein it can have a direct connection with the memory (direct memory access). To this end, between the system bus B and the peripheral apparatus control unit for the (medium) fast peripheral device an adaptation unit is provided; in this example, there is even a common adaptation unit provided for a plurality of peripheral apparatus control units.

Figure 2:
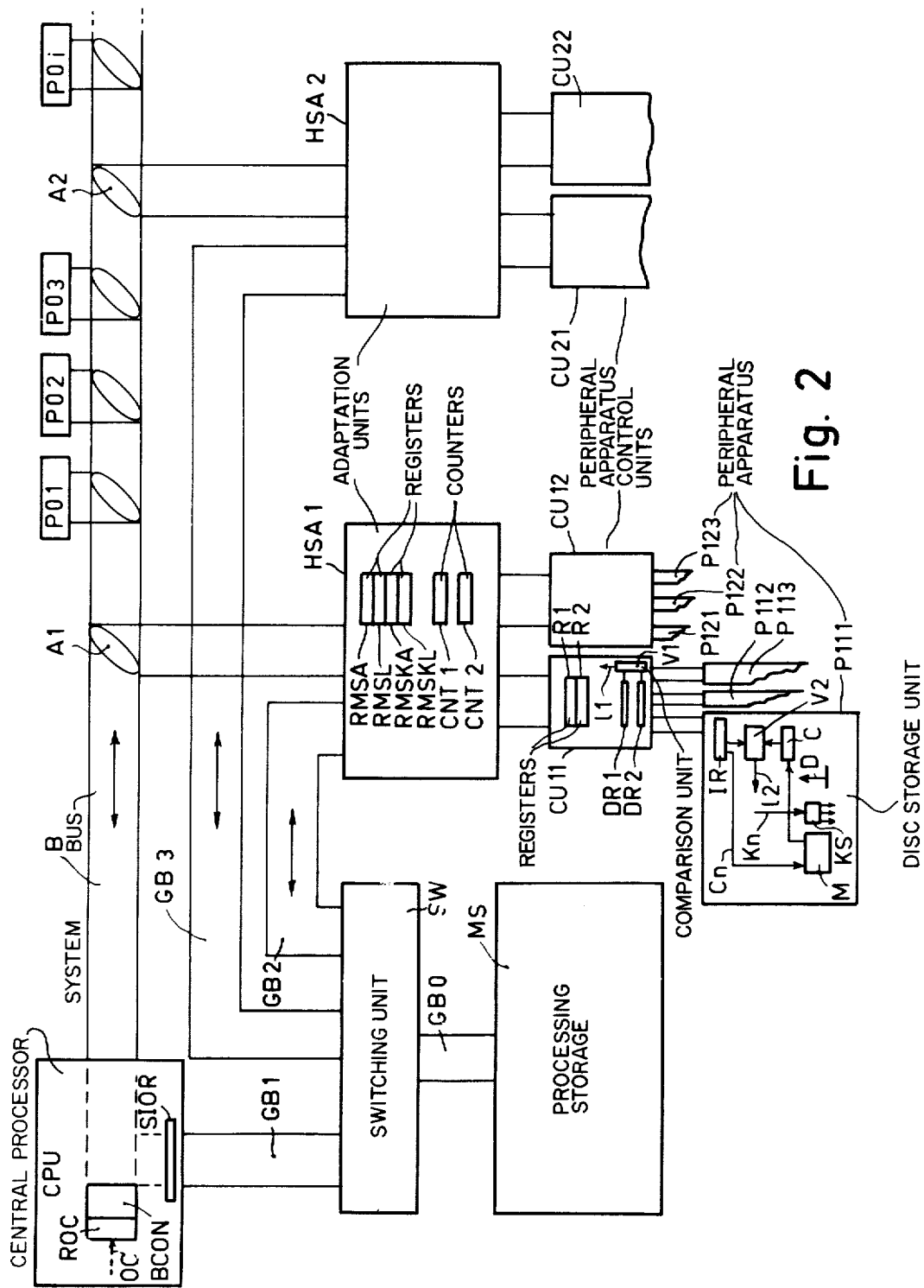
FIG. 2 shows a general set-up of the computer system according to the invention, comprising adaptation units and a disc storage unit.

FIG. 2 diagrammatically shows such a set-up. The elements of the complete set-up will be described in general, while with reference to the subsequent FIGS. 6, 7, 8 and 9 a detailed description will be given. The general set-up of the CPU of FIG. 2 is as already shown in FIG. 1. The reference B in FIG. 2 again denotes the system bus, MS being the main or processing storage which is connected to the system bus B via a connection GBo, a switching unit SW and a connection GB1. In this example the storage MS is connected like in numerous systems, to the system bus B via the central processor CPU. This was done because the CPU exchanges data with the storage most during normal traffic when no (medium) fast peripheral devices are involved. The bus B comprises branches A1 and A2 whereto adaptation units HSA1 and HSA2 are connected. Via these adaptation units HSA1 and HSA2, peripheral apparatus control units CU11, CU12 and CU21, CU22, respectively, are connected to the bus B. These control units control fast peripheral devices: CU11 controls peripheral device P111 (assumed to be a disc storage unit in this example) and further peripheral device P112 and P113 (these should also be disc storage units). CU12 controls peripheral devices P121, P122 and P123 which may be, for example, magnetic tape apparatus. Furthermore, other input and output devices PO1, PO2 ... POi, for example, a printer, a card reader, a card punch, a keyboard, a display unit, a communication channel etc. and their associated control units are connected to the bus B. All these devices PO1, . . . POi belong to the category of slow peripheral devices. Obviously, a slow magnetic tape drive can also be included (a magnetic cassette tape drive, for example). The communication via the bus B between the said peripheral devices PO1, PO2, . . . POn and the CPU and, via the CPU, also with the storage MS is effected in accordance with normal bus transport procedures. The invention does not relate to such procedures themselves, so these procedures will not be elaborated herein in as far as it is not necessary for a proper understanding of the invention.

The storage connections GB2 and GB3 are important for the transport of data from the (medium) fast peripheral devices. These connections connect the adaptation units HSA1 and HSA2 to the storage unit MS via the switching device SW. In an adaptation unit, in this case, for example, HSA1, the said first and second means mentioned in the summary of the invention are provided in the form of a number of registers RMSKA, RMSL, RMSK, RMSKL and two counters CNT1 and CNT2. The function of these first and second means will be described hereinafter. In a peripheral apparatus control unit, in this case, for example, CU11, a number of registers R1, R2, DR1 and DR2 and a comparison unit V1 are also provided. The peripheral device P111, assumed to be a disc storage unit in this embodiment, comprises an input register IR, an arm control and displacement measuring unit M, a magnetic head selector KS, a counter C and a comparison unit V2. The function of these components will be described in detail hereinafter.

In order to illustrate the set-up and the function of the described system, an example of an input/output instruction by way of disc storage unit P111 will be given hereinafter. The data transfer between P111 and the main storage unit MS is accomplished via storage bus GB2, by means of the actions taking place in adaptation unit HSA1. When an input/output instruction (IO instruction) is started, the CPU supplies an instruction SIO, applied, for example, from storage MS to register SIOR of the CPU. Such an instruction SIO contains a number of data: see FIG. 3. OPC stands for the operation code which indicates whether a read, write or search operation is to take place in a peripheral device. The peripheral device concerned is indicated by PN. A portion AP indicates the address at which information must be read, written or searched in the peripheral apparatus PN. In the case of a disc storage unit, AP can contain: cylinder number Cn of the disc store, head number Kn for the selection of the desired disc (or disc side), and finally the sector number of the requested sector Sn on a track. IOA indicates the address at which a read or write operation must take place in main storage MS. IOL indicates the length of the storage sector of MS within which the read or write operation must take place (store protection). KA denotes the address at which in the storage unit MS the search key for a search operation to be effected in the disc storage unit (key search operation) is present. KL denotes the length of the key, i.e. the number of locations occupied by the key in the store. RL indicates the length of a record, and DL indicates the length of the data in a record RD1, RDi (see FIG. 4).

The operation is as follows. Phase 1: the CPU examines whether the HSAx contained in the address code PN is free, which means that it has not already been requested for an operation and has not yet terminated this operation. In the present example HSA1 is interrogated. If this unit is not free, the CPU will place the relevant request on a waiting list. Assume that HSA1 is free; phase 2 then follows. During this phase the CPU dispatches, via the bus B, a first operation step OC1 which has been derived from the input/output instruction and which serves for the procedure yet to be described. This operation step OC1 contains the code PN whereby the HSA1 can again be selected, and also the requested peripheral device P111 with associated control unit CU11. Furthermore, this OC1 contains an operation instruction, i.e. "searching"; this means that in the disc storage unit the cylinder Cn is to be searched. Cn is a portion (most significant) of the address at which in the disc storage unit information is to be read, written or searched. Due to this operation step OC1 the information Cn becomes transparent, which means that, without special operations being performed, it is applied, via HSA1, to the control unit CU11. Cn arrives in register R1 and proceeds, in this example, to the register IR of peripheral device P111 (because this apparatus has been selected by PN). The "search" operation instruction is then started: unit M moves the arm of the disc storage unit P111. During this "search" operation, HSA1 and CU11 are free. In P111 the arm displacement is measured in M, the result being stored in counter C. In comparison unit V2, the contents of C are compared with those of IR. In the case of correspondence the "search" operation is terminated, and a "ready" signal is applied to CU11 via line 12. Subsequently, CU11 draws the attention of the CPU by way of an interruption request: this can be a request signal from CU11 to CPU. The organization thereof is dependent on the bus procedures of the system. If this request is granted by the CPU, the CPU initiates a third phase of the IO instructions. In accordance with the invention, an operation step OC2 is formed. This step in this example consists of two parts, i.e. OC21 and OC22. OC21 again contains the code PN. There also exists a selection operation instruction, i.e. for the selection of the sector Sn in the disc storage unit which is situated on the said cylinder Cn. OC21 thus also contains this sector number Sn and, if an operation is performed per disc surface, also a head number Kn. For the execution of the selection operation instruction of this part of the operation step (OC21) these data are applied, on the basis of selection by PN, to CU11 in a transparent manner via HSA1. In this example, the head number Kn and the sector number Sn arrive in R2. The head number Kn is applied to P111, whereby the head selection is effected via selector KS. In this example, Sn is applied in CU11 to the comparison unit V1 via register DR1. The selection of the sector number Sn is then started. From the disc where the head bearing the number Kn performs a read operation, the sector numbers are applied, via line D, from P111, in this example, via register DR2, to the comparison unit V1 of CU11. This is continued until $Sn-1$ is reached: V1 reacts via line 11 at the instant at which sector number $Sn-1$ is applied in DR2.

The second part of the said operation step (OC22) occurs, viewed in time, coupled to the first part (OCS21). This step OC22 comprises again the PN-code, the operation instruction read or write, again the number Sn (checking purposes) and further data which relate to the transfer from or to the main storage unit MS. These are the data IOA and IOL. The operation step part OC22 is dispatched by the CPU via the bus B preferably directly after (or alternatively before) the dispatched of OC21. As from the instant at which the sector $Sn-1$ has been found, the CU11 is ready for controlling the read or write operation. The read or write instruction is applied in a transparent manner from HSA1 to CU11 and on to P111. Sn is present in register R2 or in DR1 (as above) and is compared in V1 with Sn which is applied via line D. If the sector $Sn-1+1=Sn$ is reached in P111, no rush situation will occur, because all data for the processing are present. Head number Kn has already been selected as described above. Furthermore, on the basis of operation step part OC22 the data IOA and IOL have been taken up in the HSA1. IOA will be present in register RMSA: storage unit address A of store MS wherein a read or write operation is to be effected. IOL will be present in register RMSL: indication of the storage region, beginning at the address A, wherein the read or write operation is to be effected. The read or write operation is controlled by the CU11. During a read operation the following takes place: CU11 reads the desired information from the disc: line D of P111 to CU11 and on in a transparent manner through HSA1, via storage unit bus GB2 and the switching unit SW, to store MS. Consequently, no buffering takes place. As from HSA1, the information from line D (actually a bundle of lines having the width of the data path, for example, 9 bits) now present in memory bus GB2 is accompanied by address information Register RSMA provides the address A on the memory bus GB2, in which in the memory the data present on the store bus GB2 are to be written. Moreover, the following takes place in HSA1: the contents of RMSA are not only applied to memory bus GB2, but also to the counter CNT1 wherein $A+1$ is calculated, so address A is increased by one address unit. Consequently, the new address for the next transfer of data to be read in P111 will be directly available. Moreover, the contents L of register RMSL are transferred to counter CNT2. Therein, $L-1$ is calculated, i.e. decreased by one unit. This increasing and decreasing by one unit of the contents of the counters CNT1 and CNT2, respectively, is effected for each subsequent store address. It is thus achieved that the storage address data and the length of the storage region, always fully updated, are available in HSA1. The transfer between P111 and the storage unit can be continued without obstruction until the value $L-i=L-L=0$ occurs in CNT2. The transfer procedure is then stopped. The unobstructed data transfer is ensured in the system without buffering if the speed of the storage unit is sufficient for the timely treatment of requests for access to the storage unit by adaptation units HSA1, HSA2, . . . as well as the CPU, in as far as necessary. The relevant requests for access are admitted to the main storage unit MS in the correct manner by the switching unit SW. The storage device, for example, an IC memory, can readily operate so fast that between successive requests for access by a given HSA there is sufficient time to treat requests by one or more other HSAs and a CPU.

If a write operation is to be effected in the disc storage unit P111, the procedure is the same as described for the read operation, a difference consisting in that the HSA1 applies read requests to the main storage unit MS. These read requests are accompanied by the address data A and $A+1$ for the successive read requests. The information read from MS is applied in a transparent manner, via SW and GB2, to CU11 by HSA1, and is subsequently read in P111 via the data line D. This is effected at the address AP which consists of the cylinder Cn found, the selected head Kn and the sector Sn reached.

using the described division of the input/output instruction into two separate operation steps OC1 and OC2, the object of the invention is achieved. The operation steps OC1 and OC2 are independent of each other viewed in time: when a cylinder number has been found, an indefinite waiting period may occur until the next operation step OC2 (itself consisting of parts OC21 and OC22) will be performed. Furthermore, it will be obvious that each operation step OC1 and OC2 can be independently executed. The peripheral device control unit initiates the peripheral apparatus, the operation instruction being independently executed without intervention by the CPU.

Input/output instructions must thus be studied to establish to what extent and where the division into independently executable and time-independent operation steps can be effected. Hereinafter, the key search instruction, related to the foregoing example, will be described as an input/output instruction for a disc storage unit.

Figure 3:
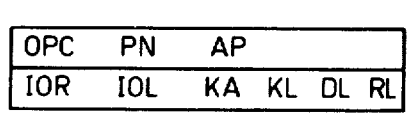
FIG. 3 shows an example of an input/output instruction format as used in the embodiments shown in FIG. 2 and the subsequent Figures.
Figure 4:
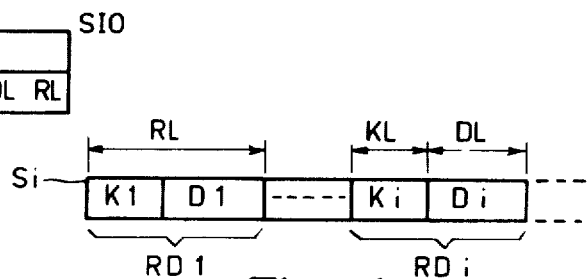
FIG. 4 shows an example of a sector set-up of a disc storage unit as used in the subsequent Figures.

As has already been stated, HSA1 comprises registers RMSKA and RMSKL for this key search instruction. A sector Si of the disc storage unit P111 is divided into a number of records. Each record can contain a key, a possibly unnamed portion, and a data portion. This is shown in FIG. 3. Si comprises records RD1, RD2, . . . Each record RDi comprises a key Ki, which itself has a length KL and a data portion Di having a length DL (including the possibly unnamed portion).

The key search instruction is completed in the computer system according to the invention as follows: the beginning of the instruction, i.e. operation step OC1 and operation step part OC21, is the same as for a described read/write operation in the disc storage unit. This holds good until the sector Sn is found. This is phase 3. The specific portion of the key search procedure is contained in the operation step part OC22 (see above). This operation step part comprises: instruction key search, Sn, IOA, IOL, KA, KL, DL, RL. The meaning of these letter combinations has already been described (see inter alia FIG. 3). The data IOA, IOL, KA and KL are placed in the registers RMSA, RMSL, RMSKA and RMSKL by way of a procedure via bus B. The data Sn, DL and RL proceed to CU11. The key search instruction results in a store request by HSAI to MS. At the address KA, originating from register RMSKA of HSA1, the first portion (for example, one character) having a width equalling that of the data path of the key K is fetched and is applied to CU11 by the HSA1 which is transparent for this information. It arrives in the register DR1. Simultaneously, the key search instruction has ensured that from the disc storage unit P111 of the assigned sector Sn also a first portion (for example, one character) of the key K has been read. This is placed in register DR2 of CU11. In the comparison device, V1, referred to in the summary of the invention as further means, the comparison is effected. In the case of correspondence, the signal present in line 11 is fixed (not shown). Subsequently, the second portion of the key K must be presented for comparison. The addressing in the storage unit MS is again effected by HSA1. For this purpose, the counters CNT1 and CNT2 are provided. The contents of RMSKA are increased by 1 in CNT1, while the contents of RMSKL are reduced by 1 in CNT2. The new storage address is applied to MS by CNT1. In CNT2 the remaining length of the key is stored. Using these data, the second portion of the key is fetched from MS and is placed in DR1. When the second key portion has also been read from P111 by CU11 and placed in DR2, comparison is again effected, etc.

If non-correspondence is detected between key portions from MS and P111, the following occurs: the key K at address KA of store MS must again be compared with a key, i.e. the key of the next record from sector Sn of P111. To this end, the key must be fetched again from the beginning from HSA1, starting at the address KA of the storage unit MS. To this end, use is made of the contents of register RMSKA in HSA1 which still stores this address AK. Similarly, the key length KL is still stored in register RMSKL of HSA1. These data are thus available for being taken up again in the counters CNT1 and CNT2, respectively. For a next portion of the key an increase and a decrease by 1 is effected therein, respectively. This reloading procedure can be repeated as long as no complete correspondence has been found between the key K in MS and the keys from the sector Sn read from P111. In order to determine in P111 where a record with subsequent key starts, the remaining length of a record RDi is updated in CU11. It is thus possible to establish where a next key in sector Sn in which the search is effected starts. The said updating for RL, the length of a record RDi, can be simply effected by means of a counter (not shown) in CU11 wherein the data RL has been placed. For each subsequent character the contents of RL are reduced by one. After the appearance of a non-correspondence, decreasing is continued until zero is passed. This indicates that a next record for the investigation of the key therein is available. The data RL are again placed in the said counter by a register in CU11 (not shown). If correspondence is established between the key originating from the storage unit MS and a key read from P111, the information associated with the said key can be written from P111 to MS. This is effected in the same manner as the reading of data from P111 to MS already described. The information concerning the data length DL in a record RDi ensures that only these data of the record RDi are transported. As was the case for the information RL, a counter (not shown) is provided in CU11 for the information DL, the value DL being continuously reduced therein.

It will be obvious that the invention is by no means restricted to the described example: even within the scope of this example, using adaptation unit HSA1 having connected thereto a disc storage unit P111 and associated control unit CU11, variants are possible. As has already been stated, the CU11 can control a plurality of disc units P112 etc. In that case CU11 should comprise a corresponding number of additional registers for storing the required data. This is because operation steps can simultaneously take place in the various peripheral apparatus, for which the CU should be capable of taking over the control at any instant (however, never more than for one peripheral device at the time). This will be discussed in detail hereinafter. Alternatively, an HSA can be provided for more than one CU. At the instant at which data transfer from/to MS indeed takes place, under the control of an HSA, the HSA is active only for the relevant peripheral device. When this transfer has been terminated, the HSA can serve for a transfer between MS and another CU connected thereto. The various CU's coupled to the same HSA than also utilize the same storage bus GB2 for HSA1 and GB3 for HSA2 as is shown in FIG. 2.

In order to provide a better insight into the scope of the invention, a number of practical embodiments of the division of input/output operations into a number of operation steps according to the invention will be described hereinafter.

A multi-cylinder instruction: a single instruction serves for the reading/writing of information to a number of cylinders of a disc storage unit. In that case the above operation steps OC1 and OC2 (divided into OC21 and OC22) occur as many times as there are cylinders requested. The instruction multicylinder read/write is thus divided into n×two operation steps, each of which can be independently executed, independent in time.

Error search instruction: for example, an error occurs in the positioning on a cylinder. This can be caused by drift: the positioner drifts from a cylinder Cn to Cn−1. For example, during the search for the sector number it is detected that something is wrong: Cn is no longer correct. An error instruction, originating from the CPU, can then be inserted. In this case this instruction consists of two operation steps i.e. an operation step containing the operation instruction: go back to the starting position of the positioning arm, and subsequently an operation step with the instruction: again "search" cylinder Cn. An input/output instruction is thus extended by an input/output error correction instruction. The division into operation steps can thus give rise to a substantial number of operation steps.

Program loading instruction: for example, for loading a program in the memory from a disc storage unit of the bus-organized computer system according to the invention, it is now possible to divide the instruction into a number of operation steps which is large enough to fetch all program sections which are stored in various locations in disc storage. For each program section operation steps exist (there are of the same kind, i.e. each again consisting of operation steps OC1 and OC2, as described above for a disc storage unit, or similar thereto), each of which can be independently executed, independent in time.

Figure 5:
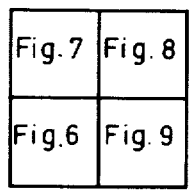
FIG. 5 shows the relationship between the FIGS. 6, 7, 8 and 9.

In the following part of the description a more detailed example of a bus-organized computer system according to the invention will be described. FIG. 5 shows the relationship of the FIGS. 6, 7, 8 and 9. This relationship can also be found in FIGS. 1 and 2.

Figure 6:
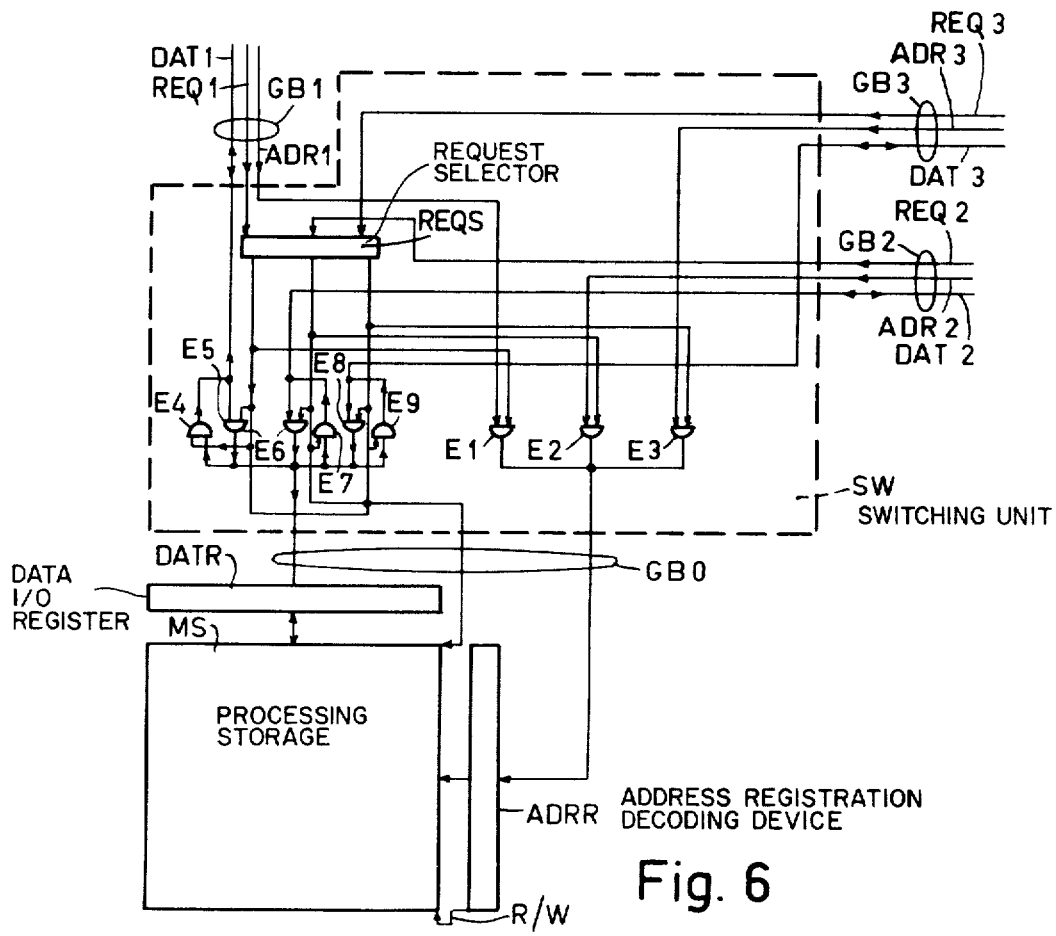
FIG. 6 shows an embodiment of a switching device for use in a bus-organized computer system according to the invention.

FIG. 6 is a more detailed representation of the main storage or memory unit MS and the switching device SW, in as far as is required for a proper understanding of the invention. MS comprises an address registration decoding device ADRR wherein, by AND-function gates E1, E2, E3, a storage address ADR is converted into a signal selecting a stored word. Data read or written utilize a data input/output register DATR. MS may be any kind of memory which can be used as a processing store for a computer system: magnetic core memory, IC store or combinations thereof. By means of the switching device SW, each time one of the three memory connections, store bus GB1, GB2 or GB3, can be connected to the memory MS via GBo. Memory bus GB1 is connected on the other end to the central processor CPU (see FIG. 7) and comprises a group of data lines DAT1, a group of address lines ADR1, and a request line REQ1. Store bus GB1 is not only connected to SW, but also to the adaptation unit HSA1 (see FIG. 8), and also comprises a group of data lines DAT2, a group of address lines ADR2, and a request line REQ2. Similarly, a memory bus GB3 is shown which is connected between SW and a second adaptation unit HSA2 (see FIG. 2). This bus also comprises a group of data lines DAT3, address lines ADR3 and a request line REQ3. The switching device comprises the AND-function gates E1, E2, . . . E9. It is to be noted that wherever connections exist which comprise a plurality of lines (for example, DAT line groups), the function gates connected thereto also have a multiple construction in practice. This means that for each line of a group of lines the relevant AND-function is realized.

Requests REQ1, REQ2 and REQ3 are applied to a request selector REQS. This may be a scanning device which successively scans the REQ lines. Requests can also be selected on the basis of priority in a priority unit. In the system according to the invention, the speed of MS in treating the requests for access is sufficient to grant all three requests REQ1, REQ2 and REQ3 before a new request REQ2 and/or REQ3 can arrive. Consequently, no waiting times occur for these requests. If a request REQ1 occurs during a scanning cycle (from the CPU), waiting times may arise for this request if simultaneously a request REQ2 and/or REQ3 exists. However, a waiting time for REQ1 is not annoying, because within the CPU these requests can be buffered.

If request REQ1 is granted, AND-function gates E1, E4 and E5 are prepared by selector REQS. If request REQ2 is granted, AND-function gates E2, E6 and E7 are prepared by REQS.

Similarly, AND-function gates E3, E8 and E9 are prepared by REQS if REQ3 is granted. It is thus achieved that either addresses ADR1 are applied to the address register ADRR via AND-function gate E1, or addresses ADR2 via E2, or addresses ADR3 via E3. Similarly, if REQ1 is granted, data DAT1 will be applied to the storage register DATR via AND-function gate E4 (reading) or via AND-function gate E5 (writing). The memory bus GB1 is thus connected to the memory bus GBo, via SW. If REQ2 is granted, data DAT2 are applied, via AND-function gate E6 (writing) to the register DATR, or via AND-function gate E7 (reading). Finally, if REQ3 is granted, data DAT3 are applied to the register DATR via AND-function gate E8 (writing) or via AND-function gate E9 (reading). The granted requests are applied to the storage unit MS via an OR-connection, so that this memory is activated. The command for reading or writing in the storage unit MS is assumed to be contained in this example in the group of address lines ADR1, ADR2 or ADR3. Decoding in ADRR produces the relevant R/W command (see below ADRR of FIG. 6).

Figure 7:
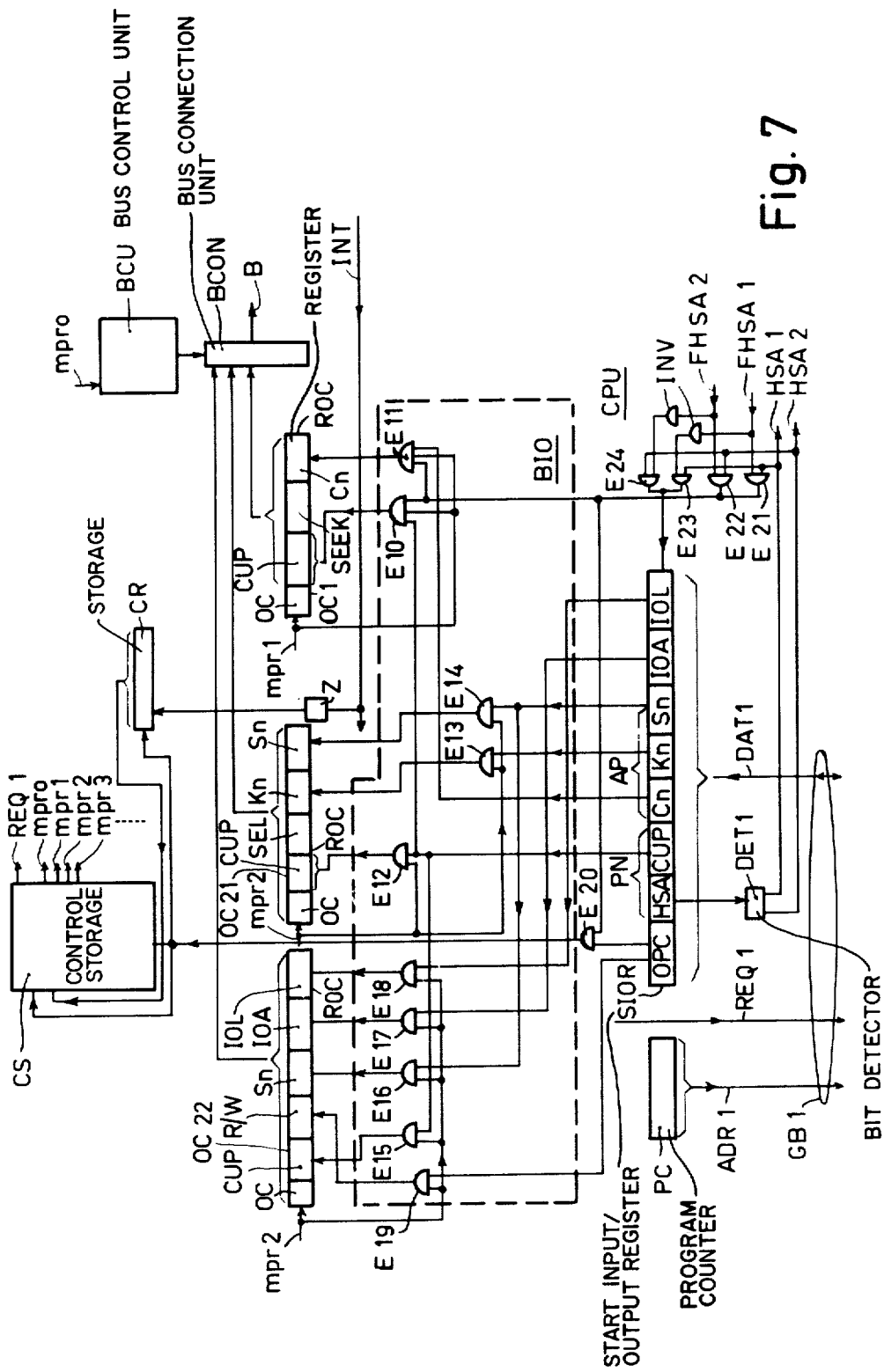
FIG. 7 shows a detailed embodiment of a central processor for a bus-organized computer system according to the invention.

FIG. 7 shows the sections of the central processor CPU which constitute parts for the invention and/or which are of importance for a proper understanding of the invention. PC is the program counter wherein the addresses ADR1 are generated which assign the words in the storage unit MS which are required for the execution of the program. In the case of a request REQ1, supplied by the microprogram stored in the control storage CS of the CPU in this example, the address ADR1 requests an instruction from storage MS. The instruction arrives, via the line group DAT1, in the CPU and is placed in the register SIOR. For the invention, it is assumed that an input/output instruction is concerned. The register SIOR, denoted as Start input-/Output Register, contains the data required for executing an input/output instruction SIO (see also FIG. 3) which in that case forms the operation code OPC.

Considering the further set-up of the device, in this register SIOR the PN-code is split into two parts: HSA, this bit indicating whether HSA1 or HSA2 is involved in the instruction. This bit is recognized in DET1. Consequently, either line HSA1 or line HSA2 carries a 1-signal. The part CUP of PN indicates the peripheral apparatus control unit CUij and the peripheral device Pijm which are involved in the IO process. Code AP, the address in the peripheral device Pijm, is split into three parts in this example: Cn (cylinder number), Kn (head number) and Sn (sector number). This splitting is mainly due to the fact that in this case, by way of example, a disc storage unit is used as a peripheral device; this constitutes a proper basis for making a division into operation steps of the input/output instruction according to the invention. Finally, there are also the parts IOA and IOL. (The key search procedure will not be treated in this example). During the execution of the instruction SIO, three phases are completed in the CPU. During phases two and three, according to the invention, the operation steps OC1, OC2 are formed under the control of the microprogram, in this case denoted by the microprogram steps mpr 1 and mpr 2. These operation steps, successively appearing as individual and independently executable operation steps, are present in register ROC (shown three times) wherefrom the operation steps are applied, via a bus connection unit BCON, to the bus B for dispatch. A dispatch via the bus B is effected according to a dispatch procedure which is controlled by a bus control unit BCU, which itself is commanded by a microprogram step mpro. Dispatch and receipt procedures via a bus in a computer system are known per se, so they need not be elaborated herein.

The part of the CPU shown furthermore comprises AND-function gates E10, E11, . . . E19 which, in conjunction with the interconnections, constitute the said control means BIO. E20, . . . E24 are further AND-function gates. Register CR is again shown (see FIG. 1).

Assume that in register SIOR there is an OPC instruction indicating that a data transfer is to be effected between storage unit MS and a peripheral device of a fast type. The OPC code serves, if passed by AND-function gate E20 in the control store CS, to indicate a first of a series of microprogram steps: mpr 1. This address code is also stored in CR. The HSA code in SIOR produces a 1-signal on line HSA1 or HSA2, one of the two adaptation units thus being selected. If the selected HSA is free, it is thus occupied (see FIG. 8). The initially free state is signalled via lines FHSA1 and FHSA2, respectively. In the case of selection of HSA1, the free signal is applied to CPU via AND-function gate E21, and in the case of selection of HSA2 via AND-function gate E22. This is phase one of the procedure. The AND-function gates E10 and E11 are thus prepared, and the OPC is also applied to CS via AND-function gate E20. The microprogram step mpr 1 is thus activated, the AND-function gates E10 and E11 then being opened, so that the code CUP as well as the value Cn are applied to register ROC (second phase). These CUP and Cn constitute the elements of a first operation step OC1. Microprogram step mpr 1 adds thereto the general code OC to indicate that this is an operation step, and also adds the instruction SEEK. Subsequently, the microprogram step mpr o arises which ensures that the bus control unit BCU applied the operation step OC1, via bus connector BCON, to the bus and that the dispatch takes place. See further the description given with reference to the FIGS. 8 and 9 for the completion of OC1. If it is found during a selection request HSA1 or HSA2 that the relevant adaptation unit is already occupied, gate E21 and E22, respectively, remains closed. However, due to the nonfree 0-signal on FHSA1 or FHSA2, the AND-function gate E23 or E24 is opened via an inverter INV. On the output of such a gate a signal appears which ensures that the SIO instruction is placed on a waiting list in register SIOR. When OC1 has been completed, an interruption request INT is applied to CPU. This interruption request INT is dealt with in the CPU by interrupt means (not shown) which are known per se. Simultaneously with this request, the contents of CR are modified by device Z such that thereby the microprogram word mpr 2 can be selected in CS. As a result, the step mpr 2 is produced by the microprogram in CS (third phase). mpr 2 opens AND-function gates E12, E13 and E14, with the result that the code CUP and the value Kn or Sn, respectively, are applied to register ROC. This produces the part OC21 of the second operation step OC2, besides the code OC also the instruction SEL being added thereto by mpr 2. This is followed by another microprogram step mpr o which initiates the dispatch via the bus B. Microprogram step mpr 2 also provides the formation of the part OC22 of operation step OC2. OC22 is also formed in a register ROC: via AND-function gate the relevant part of the OPC is transferred from register SIOR, i.e. the instruction R/W: read or write (search key remains undiscussed) to ROC. Furthermore, AND-function gates E15, E16, E17 and E18 are opened to place the data CUP, Sn, IOA and IOL in register ROC. The microprogram step mpr o again appears, whereby the dispatch of OC22 via the bus connector BCON on the bus B is initiated. It is to be noted that OC22 can also be transported via the bus before OC21. The task of the CPU has then been completed, and the further execution of the data transport process is effected fully independently. For this process, see the below description given with reference to the FIGS. 8 and 9.

Figure 8:
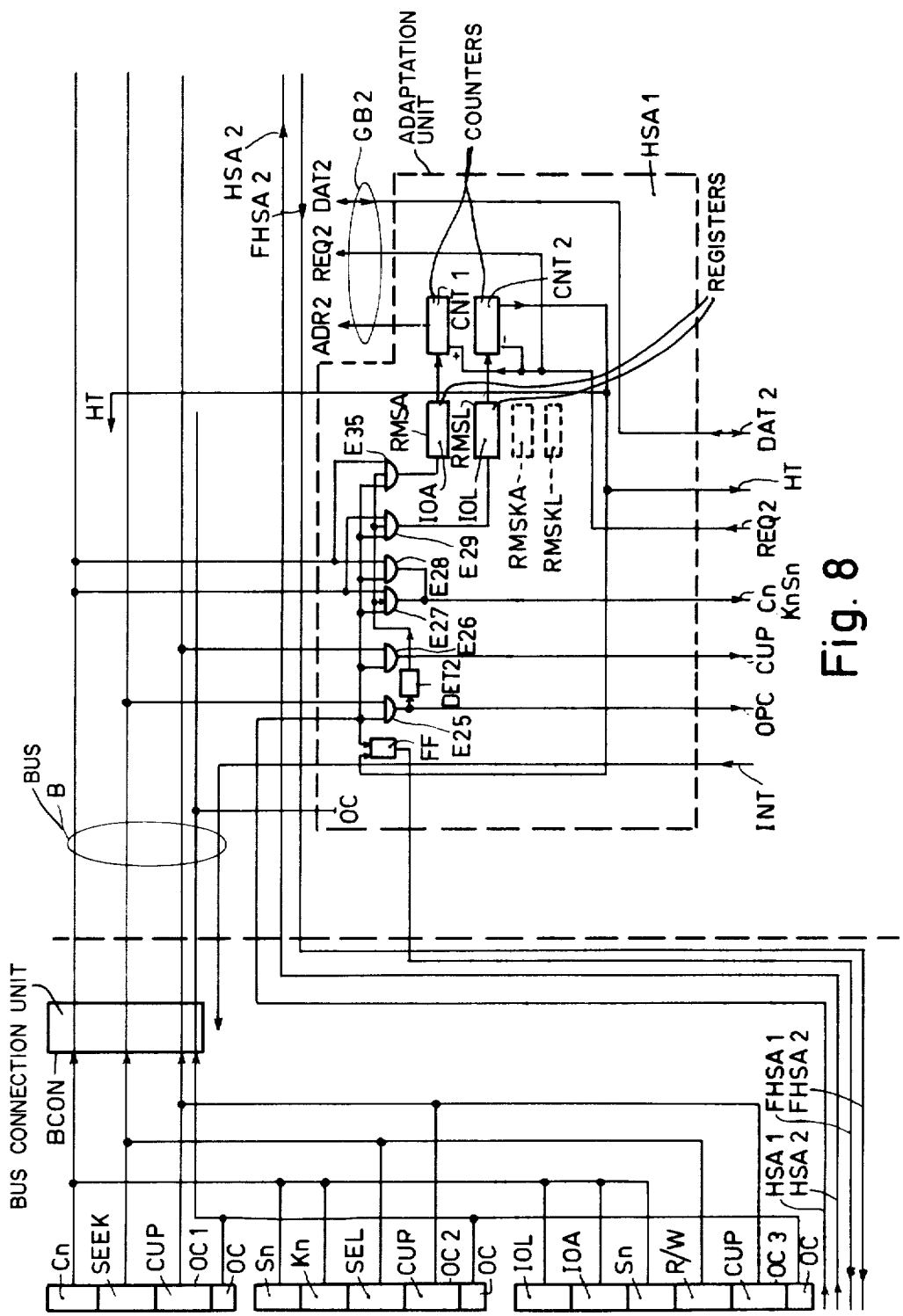
FIG. 8 shows a more detailed embodiment of an adaptation unit as used in a bus-organized computer system according to the invention.

FIG. 8 is a detailed view of the adaptation unit HSA1, showing the connections to the system bus B, the connections to the storage bus GB2 and the connections to the peripheral apparatus control units CU11 and CU12. As has already been described with reference to FIG. 6, the HSA1 is selected by a line HSA1. If HSA1 is free, first a free signal (1-signal) is present on the line FHSA1 which is a prepare signal to enable the execution of microprogram step mpr 1 (see description given with reference to FIG. 7). This free signal FHSA1 originates from a flipflop FF in HSA1. This flipflop is set upon the arrival of the selection signal on line HSA1, and its output (right) receives a 0-signal. As a result, line FHSA1 also carries a 0-signal. This will take place, possibly after a delay, after the said microprogram step has already been started. HSA1 is thus occupied, and a new selection request on line HSA1 will not be granted again: AND-function gate E21 is closed by the 0-signal on FHSA1. The HSA1 furthermore comprises AND-function gates E25, E26, . . . E30, a detector DET2, the registers RMSA, RMSL, RMSKA, RMSKL (in a set, also referred to as "scratch"), and the counters CNT1, CNT2. IF HSA1 has been selected via line HSA1, the AND-function gates E25, . . . E30 are thus prepared. If the first operation step OC1 is then applied, via the bus B, by the CPU, it will be intercepted in HSA1, AND-function gate E25 allows passage of the OPC code present on bus B, i.e. the seek instruction for OCL. This instruction is transferred to the control units CU11 and CU12 (see FIG. 9). Similarly, AND-function gate E26 allows passage of the address of the peripheral control unit and the relevant peripheral device address CUP. This is applied to CU11 and CU12. Furthermore, AND-function gates E27 and E28 allow passage of Cn (cylinder number). This is possible because the input of E27, provided with a dot in the drawing and originating from the detector DET2, carries a 1-signal in this situation. The operation step OC1 is thus applied by HSA1 in a transparent manner to the control equipment coupled thereto. When OCL has been completed in this equipment and the associated peripheral device, HSA1 applies the interruption request INT to the CPU. If the operation step part OC21 is then applied via the system bus B and HSA1 is selected again, the gates E25 ... E30 are prepared again. Via E25, the OPC code SEL is then applied to CU11, CU12. Via E26, the CUP address is allowed to pass. Gate E27 and gate E28 then pass on the data Kn and Sn. This is possible because also in this situation the input of E27, provided with a dot and originating from DET2, carries a 1-signal. The operation step part OC21 has thus been applied to HSA1 in a transparent manner. If the operation step part OC22 is then dispatched via the bus and HSA1 is selected again, the gates E25 ... E30 are prepared again. E25 passes on the OPC code, now the R/W code. In detector DET2 this code is recognized, and the 0-signal on the output of DET2 is thus converted into a 1-signal. The input provided with a dot (a dot indicates an inversion of the applied signal) of E27 then no longer carries a 1-signal, but rather a 0-signal while the inputs of AND-function gates E29 and E30 connected to DET2 carry a 1-signal. AND-function gate E26 again allows passage of the CUP code. Gate E27 remains closed, and gate E28 allows passage of the sector number Sn once more. Via gate E29, the information IOL, the storage region length, is applied to the register RMSL. Via gate E30, the information IOA, the storage starting address, is applied to the register RMSA. If the search key instruction is involved, the registers RMSKA and RMSKL will be filled with the key data (address and length). In this example, however, this is not elaborated. If data are to be transferred, a request REQ2 from the peripheral device is applied to HSA1. This request is passed on, contained in the storage bus GB2, to the switching unit SW (see FIG. 6). In the bus GB2 also the data DAT2 and the address ADR2 from register RSMA are present. The following also occurs in HSA1 under the influence of the request REQ2: the counter CNT1 is instructed to increase its contents, i.e. the value IOA originating from RMSA, by one unit. As a result, the new address for the next request REQ2 is already prepared: IOA+1 (=ADR2). Similarly, the counter CNT2 is requested by REQ2 to reduce its contents, i.e. the value IOL originating from RMSL, by one unit: IOL-1. This increasing and reducing is effected for each new request REQ2, until in counter CNT1 the value IOA+IOL for ADR2 is reached and in counter CNT2 the value IOL−IOL=0. When the counter CNT2 reaches the position 0, at 1-signal appears on line HT. The transport is thus stopped. By means of this 1-signal on HT, the flipflop FF will also be reset: the HSA1 is free again. This signal HT is also applied to the CPU (as an interrupt) to signal that the input/output instruction has been completed.

Figure 9:
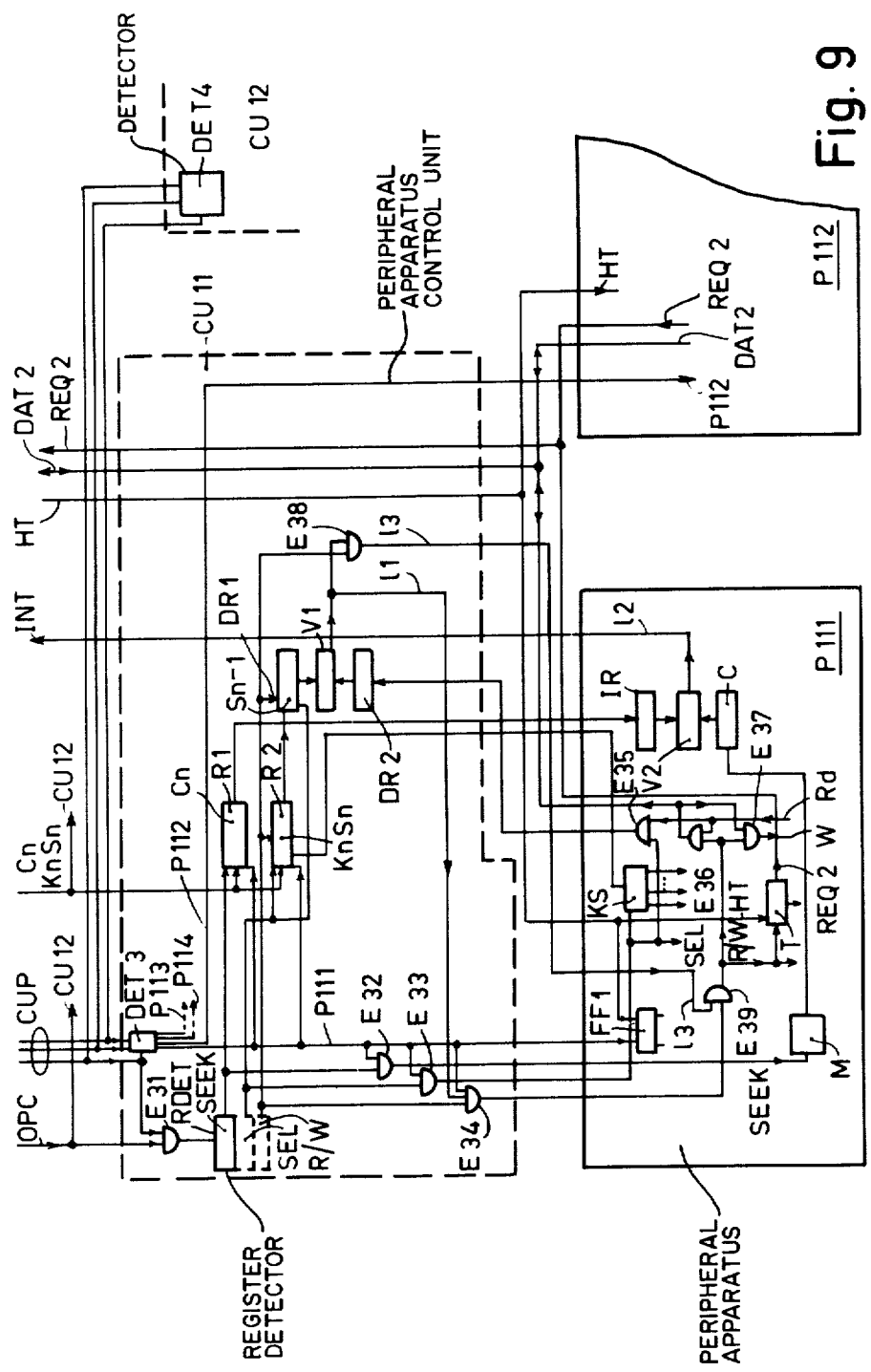
FIG. 9 shows a more detailed embodiment of a peripheral apparatus control unit and a peripheral device as used in a bus-organized computer system according to the invention.

FIG. 9 shows in detail how a peripheral apparatus control unit CU11 and a peripheral device P111 are constructed in view of the set-up according to the invention. CU11 comprises AND-function gates E31, E32, E33, E34 a detector DET3, a register detector RDET, registers R1, R2, DR1 and DR2, and a comparison device V1. In this example peripheral device P111 (being a disc store unit) comprises a flipflop FF1, an arm control and displacement measuring unit M a time unit generator T, a head selector KS, a register IR, a counter C, a comparison unit V2 and AND-function gates E35, E36, E37, E38 and E39.

In reaction to the appearance of the operation step OC1, the OPC code SEEK is applied by HSA1 to CU11 and CU12. Via the line group CUP, the address code for the desired CU with peripheral device P is applied. In detector DET3 the code for CU11 is recognized. When the code for CU12 is on the lines CUP, it is recognized in the detector DET4 of CU12. Assume that CU11 is selected. The gate E31 is thus prepared and allows the OPC code SEEK to pass to RDET. In DET3 it is detected which of the peripheral device P111 is involved in the operation step OC1. Assume that P111 is involved: the line P111 in CU11 then carries a 1-signal. The flipflop FF1 of P111 then assumes its occupied position. The SEEK instruction is then applied to the unit M of P111 via AND-function gate E32. The SEEK instruction opens the register R1 in CU11 in order to take up the information Cn, also because of the indication of R1 by the line P111 in CU11. The completion of the operation steps OC1 and OC2 will be described in detail hereinafter with reference to peripheral apparatus P111.

The information Cn appears in register IR in P111. On the basis thereof, the cylinder Cn of the disc unit must be searched. The unit M has received the SEEK operation instruction, and the arm movement is followed by the counter C. When the position C corresponds to the value Cn in IR, the comparison unit V2 supplies a 1-signal via line 12. This signal is applied as the interruption request INT to the CPU, via CU11 and HSA1. The requested cylinder Cn has then been reached, and P111 awaits the next operation step OC2. When the part OC21 of this operation step is applied via bus B and HSA1, the address being CU11 and P111, the instruction SEL is recognized in RDET and is applied, via the prepared gate E33, to the peripheral apparatus P111. The selection operation in P111 is thus performed. Moreover, the data as regards head number Kn and sector number Sn have thus also been applied to register R2 of CU11. This is possible because of the fact that R2 is opened by the line P111 and the indication of R2 by the operation instruction SEL from RDET. The information Kn is applied to the head selector KS in P111. In reaction to the instruction SEL (as input signal on KS), the head selection is effected. The sector number information Sn is reduced by one unit and is applied to the register DR1. The following then takes place: the instruction SEL ensures that reading takes place on the disc side associated with the head Kn. On line Rd the information read is present, notably the sector number code of the sectors on the said disc side. An AND-function gate E35, prepared by SEL, applies the sector number read to the register DR2 of CU11. Therein, in V1, Sn−1 and a sector number read are compared. In the case of correspondence, a 1-signal is present on line 11. This signal serves to prepare gate E34 (see below). The desired sector Sn but one is then reached. The operation step part OC22 is also present: the R/W instruction arrives in RDET via AND-function gate E31, in this example because of the CUP code whereby CU11 has been assigned. Because of the assignment of P111 by the CUP code, the instruction R/W is applied to P111 via the gate E34 prepared by 11. In P111 the time unit generator T is started, and on the basis of the code R/W a read or write operation is performed in the sector Sn. The reading or writing in the correct sector Sn is checked in CU11: the instruction R/W opens register R2, assigned by P111, so as to take up the information Sn again. Now Sn, instead of Sn−1, is applied to DR1. If the value Sn, read from the relevant disc side, is meanwhile also present in register DR2, a 1-signal appears on line 13, prepared by the AND-function gate E38 which is prepared by the instruction R/W. By way of this 1-signal 13, the instruction read or write R/W is applied via gate E39, to generator T and the gate E36 and, in an inverted manner, to gate E37. In the case of a read operation, E36 is open, and in the case of a write operation the gate E37 is open. Whenever a read or write operation for a data unit has taken place, T supplies a signal REQ2. This request REQ2 is treated in HS_.1 (address formation for storage unit MS). The data units read are applied, via gate E36, to the lines DAT2, to HSA1, and on to the switching device SW so as to be applied to storage unit MS. Data to be written are applied via gate E37 and are applied to the selected sector Sn of the disc storage unit via line W. The completion of the data transport is signalled by a 1-signal on the line HT. The generator T is thus stopped and the flipflop FF1 is reset, thus indicating that the peripheral apparatus P111 is free again.

For completeness' sake it is to be noted that, for example, the peripheral device with control unit CU12 may be magnetic tape equipment. In such a case the operation steps OCi as described above will have an adapted structure. However, it is a fact that the function of the adaptation unit in this case HSA1, is not modified, so it is directly suitable for such a peripheral equipment. In view of the bus set-up of the system, the bus lines will transfer other data, and the gates E25, E26, E27 and E28 will pass on these other data (relating to the tape equipment). However, the gates E29 and E30 remain intended for the data of storage unit MS which are supplied by way of an operation step, comparable to OC2 of the described example.

What is claimed is:

1. A bus organized computer system, said system including a central processing unit, a central data storage unit interconnected with said central processing unit and a plurality of peripheral devices, said peripheral devices being of at least one type and said peripheral devices being interconnected with said central processing unit, said system comprising:
    a bus structure interconnecting said central processing unit with said central storage unit and said peripheral devices;
    a bus control unit within said central processing unit for controlling data traffic on said bus structure;
    said central storage unit being interconnected with said bus structure through said central processing unit;
    a plurality of peripheral apparatus control units;
    a plurality of peripheral devices interconnected with each of said peripheral apparatus control units;
    means within said central processing unit to divide single program instructions for complete input/output operations serving for the transfer of data within said computer system to or from said peripheral devices into a plurality of separate instructions for discrete operations, the steps of said instructions constituting steps which relate to specific functional characteristics of at least one member of said plurality of peripheral devices;
    means to transfer said instructions over said bus structure to said peripheral devices via said peripheral apparatus control units connected thereto such that said instructions can be individually executed in a particular addressed device of said plurality of peripheral devices in its own time in a specific sequence but time independently of other operation instructions within that sequence, to provide for the complete input/output operation;
    means within each of said peripheral apparatus control units to acknowledge receipt of a separate discrete operation instruction to said central processing unit such that said central processing unit can transfer the next sequential separate operation instruction to the peripheral apparatus control unit controlling a particular addressed device of said plurality of peripheral devices;
    means to transfer said separate instructions to that peripheral apparatus control unit controlling the peripheral device addressed in said instructions over said bus structure individually, further including means to transfer the next separate instruction divided from a given single program instruction over said bus structure only in response to the receipt by said central processing unit of an interruption request signal from said peripheral apparatus control unit; and
    means within said central processing unit to record and store the execution of each of said separate discrete operation instructions executed through said peripheral apparatus control units such that said central processing unit can transfer the next sequential separate instruction and knows the status of execution of each instruction.

2. A bus organized computer system as defined in claim 1 wherein:
    said single program instructions for complete input/output operations include a code for the complete input/output operation, an address denoting the specific peripheral device to execute said operation and its associated peripheral apparatus control unit, an address in an address space in said peripheral device, and an address in an address space in a storage in a device in said computer system to which or from which data are to be transferred; and
    wherein a first separate instruction divided from said single program instruction for complete input/output operation comprises a code for the specific operation step, an address denoting the specific peripheral device and the interconnected peripheral apparatus control unit to execute said instruction, and a portion of said address in an addressed space in the addressed peripheral device.

3. A bus organized computer system as claimed in claim 2 wherein:
    a second said separate instruction divided from said single program instruction for complete input/output operation comprises:
    a code for the specific operation step, an address denoting the specific peripheral device and its interconnected peripheral apparatus control unit to execute said operation; and
    a starting address and region length information denoting a region in the addressed space in the device in the comuter system to which or from which data are to be transferred.

4. A bus organized computer system as claimed in claim 3 wherein the device in said computer system to which and from which data are to be transferred is said central storage unit; and further comprising:
    an adaptation unit positioned between said peripheral device, its interconnected peripheral apparatus control unit and said bus structure;

a separate data transfer connection provided between said adaptation unit and said central storage unit for transferring data between one of said peripheral devices and said central storage unit through said adaptation unit; and means to furnish to said adaptation unit the starting address and the region length information denoting a region in the addressed space in the device in the computer system to which or from which data are to be transferred;

said adaptation unit controlling data transfer between said central storage unit and said peripheral device over said separate data transfer connection during the execution of the operation step defined by said separate second instruction.

5. A bus organized computer system as claimed in claim 3 wherein the device in the computer system to which or from which data is to be transferred is said central storage unit; and further comprising:

an adaptation unit connected between one of said peripheral devices, its peripheral apparatus control unit and said bus structure;

a separate data transfer connection provided between said adaptation unit and said central storage unit for transferring data between one of said peripheral devices and said central storage unit through said adaptation unit;

said single program instruction for a complete input/output operation being a search key instruction for a search operation wherein the operation step denoted by said second separate instruction is a comparison instruction; and means to provide to said adaptation unit the starting address and the region length information denoting the address of a key in said central storage unit and the length of said key respectively;

said second separate instruction denoting the controlled comparison of said key from said central storage unit and keys from a plurality of said peripheral devices during execution of said operation step;

said key in said central storage unit being provided to said adaptation unit by means of a separate data transfer connection during said search operation.

6. A bus organized computer system as claimed in claim 4 wherein:

a first and a second counter are included in said adaptation unit;

said starting address and region length information are provided to a first and a second register in said adaptation unit respectively and transferred therefrom into said first and a second counters respectively;

counts in said first and said second counters being incremented and decremented respectively each time a unit of data has been transferred to or from said central storage unit during the operation step defined by said second separate instruction;

said second counter generating an end of transfer signal when said counter therein reaches zero.

7. A bus organized computer system as claimed in claim 5 wherein:

said starting address and region length information are taken up in said first and said second registers in said adaptation unit respectively and transferred therefrom into said first and second counters respectively; and a first and a second counter are included in said adaptation unit;

the counts in said first and said second counters being incremented and decremented respectively each time correspondence occurs between the key in said central storage unit and successive keys from one of said plurality of peripheral devices.

8. A bus organized computer system including a central processing unit, a central storage unit and a plurality of peripheral devices, said system comprising:

a bus structure interconnecting said central processing unit, said central storage unit and said peripheral devices;

control means within said central processing unit;

at least one peripheral apparatus control unit connected to at least one of said peripheral devices and to said control means via said bus structure;

means within said control means to divide single input/output program instructions for the transfer of data within said computer system into a plurality of separate operation instructions which are independent in time and which can be independently executed by said peripheral apparatus control unit;

means to store within said computer system a record of which of said operation instructions have been executed;

a bus control unit within said central processing unit;

said control means dispatching said operation instructions along said bus structure under the control of said bus control unit to one of said peripheral apparatus control units;

means within said peripheral apparatus control unit to cause the peripheral device addressed in said operation instruction to execute said instruction; and means within said peripheral apparatus control unit to interrupt said central processing unit after the execution of an operation so that said central processing unit can record the execution of said operation and cause the next operation instruction to be dispatched.

9. The bus organized computer system of claim 8 further comprising:

at least one adaptation unit in communication with said bus structure and with at least one peripheral apparatus control unit and with said central storage unit;

said adaptation unit being connected to said central storage unit via separate data lines;

said adaptation unit including storage means for storing addresses of the data to be transferred and the location to which it is to be transferred; and means in said adaptation unit to enable data transfers between said central storage unit and a peripheral device through a peripheral apparatus control unit.

10. The bus organized computer system of claim 9 further comprising:

comparator means in said adaptation unit for comparison operations for key searches; and means in said adaptation unit for executing said comparison operations using addresses in said central storage unit and in one of said peripheral devices.

11. The bus organized computer system of claim 9 further comprising:

a bus connection unit connecting said bus structure to said central processing unit;

a program counter in said central processing unit to supply addresses to said central storage unit;

a register in said central processing unit to receive data from said central storage unit;
control means in said central processing unit;
storage means in said central processing unit;
control storage means in said central processing unit;
an input/output program instruction register in said central processing unit to receive instructions from said central storage unit and feed said instructions to said control means;
said control storage means containing microprogram instructions and being addressed by said input/output program instruction register;
a register to store each of said input/output program instructions while it is being divided into microprogram instructions, said register being connected to said control means and said control storage means;
said microprogram instructions being a sequence of operation steps, each of which corresponds to a specific operation of a device in said bus organized computer system;
a plurality of said microprogram instructions corresponding to a single input/output program instruction;
said control means serving to select said plurality of microprogram instructions from said control storage means;
register means for storing said microprogram instructions under the control of said control means;
means to transfer said microprogram instructions over said bus structure to one of said peripheral apparatus control units for execution; and
means in said peripheral apparatus control unit to interrupt said central processing unit control means after the execution of each microprogram instruction to update the status of said register storing said microprogram;
said updating permitting the addressing of the next microprogram instruction for the next operation to be dispatched over said bus structure for execution by a peripheral apparatus control unit.

12. The bus organized computer system of claim 11 further comprising:
switching means connecting said at least one adaptation unit to said central storage unit;
said system bus structure having branches to said at least one adaptation unit.

13. The bus organized computer system of claim 12 further comprising:
at least one register in said adaptation unit to store the addresses in said central storage unit to which said data is to be transferred; and
at least one counter to determine the address in said central storage unit to which the next data transfer is to be sent;
said at least one counter and register serving to update the storage address and lengths of records continuously.

14. The bus organized computer system of claim 13 further comprising:
a further plurality of registers in said adaptation unit for key searching, said further plurality of registers containing addresses to be searched and the length of the key.

15. The bus organized computer system of claim 12 further comprising:
an address registration decoding device;
a plurality of AND-function gates to convert an address into a signal to select a word from said central processing unit;
switching means connecting a plurality of bus lines of said bus structure to said central storage unit; and
a request selector to scan all inputs to said switching means;
said request selector selecting the AND-function gates to transfer a request to said central storage unit.

16. The bus organized computer system of claim 8 wherein said control means includes a plurality of AND-function gates.

* * * * *